United States Patent
Li

(10) Patent No.: US 7,557,692 B2
(45) Date of Patent: Jul. 7, 2009

(54) FAST DETECTING OBSTACLE METHOD AND PARKING SENSOR APPARATUS USING THE SAME

(76) Inventor: Shih-Hsiung Li, 8F-1, No. 23, Sec. 1, Hangchow S. Rd., Taipei (TW)

( * ) Notice: Subject to any disclaimer, the term of this patent is extended or adjusted under 35 U.S.C. 154(b) by 388 days.

(21) Appl. No.: 11/612,559

(22) Filed: Dec. 19, 2006

(65) Prior Publication Data

US 2008/0143501 A1    Jun. 19, 2008

(51) Int. Cl.
*B60Q 1/00*      (2006.01)
(52) U.S. Cl. .................... 340/435; 340/903; 340/425.5; 340/436; 701/96
(58) Field of Classification Search ................ 340/901, 340/903, 425.5, 435, 436, 438; 701/96
See application file for complete search history.

(56) References Cited

U.S. PATENT DOCUMENTS

| | | | | |
|---|---|---|---|---|
| 5,410,479 | A * | 4/1995 | Coker | 701/23 |
| 6,008,546 | A * | 12/1999 | Sage | 307/9.1 |
| 6,157,294 | A * | 12/2000 | Urai et al. | 340/436 |
| 6,163,252 | A * | 12/2000 | Nishiwaki | 340/435 |
| 6,281,786 | B1 * | 8/2001 | Adachi et al. | 340/435 |
| 6,434,486 | B1 * | 8/2002 | Studt et al. | 701/301 |
| 6,492,902 | B2 * | 12/2002 | Nishimoto et al. | 340/506 |
| 6,642,839 | B1 * | 11/2003 | Gunderson et al. | 340/435 |
| 6,933,837 | B2 * | 8/2005 | Gunderson et al. | 340/436 |
| 6,940,398 | B2 * | 9/2005 | Li | 340/435 |
| 7,061,372 | B2 * | 6/2006 | Gunderson et al. | 340/435 |
| 7,362,216 | B2 * | 4/2008 | Li | 340/435 |
| 2003/0141965 | A1 * | 7/2003 | Gunderson et al. | 340/431 |
| 2003/0222773 | A1 * | 12/2003 | Li | 340/435 |
| 2004/0090314 | A1 * | 5/2004 | Iwamoto | 340/425.5 |

\* cited by examiner

*Primary Examiner*—Toan N Pham
*Assistant Examiner*—Travis R Hunnings
(74) *Attorney, Agent, or Firm*—Rabin & Berdo, P.C.

(57) ABSTRACT

A parking sensor apparatus has at least two ultrasonic sensors, and a method to decrease erroneous determinations of the parking sensor apparatus has a first detecting process and a second alternate process. In first detecting process, the two ultrasonic sensors are controlled to transmit and receive ultrasonic detecting signals. If a reflected ultrasonic signal is detected and an obstacle is determined to be existed according to the ultrasonic signal, the two ultrasonic sensors are controlled alternately in second alternate detecting process to further determine whether the obstacle is real or not. That is, the method and the parking sensor apparatus only requires two detecting cycles to determine the real obstacle, so the method and parking sensor apparatus have fast response whether any obstacle is close to the vehicle.

8 Claims, 5 Drawing Sheets

FAST DETECTING OBSTACLE METHOD AND PARKING SENSOR APPARATUS USING THE SAME

BACKGROUND OF THE INVENTION

1. Field of the Invention

The present invention relates to a detecting obstacle method and apparatus using the same, especially to a fast detecting obstacle method and apparatus using the same.

2. Description of Related Art

With reference to FIG. 4A, a vehicle (20) has a rear parking sensor apparatus (70) to detect an obstacle behind the vehicle (20) and determine a distance from the sensor to the obstacle with ultrasonic sound when backing a vehicle (20). The parking sensor apparatus (70) operates on principles similar to radar but operates at ultrasonic frequencies rather than radio frequencies. The parking sensor apparatus (70) outputs an ultrasonic detecting signal to detect whether any obstacle is behind the rear of the vehicle and a transmitting route of the ultrasonic detecting signal is like a horn sharp, which is marked by a solid line (R). When the parking sensor apparatus (70) is attached to a lower position of the rear of the vehicle, the transmitting route of the ultrasonic detecting signal is close to a road surface. However, when the vehicle (20) is on the road with an uneven road surface (30), the parking sensor apparatus is easily triggered to alarm a vehicle driver, but the alarm is not necessary. With further reference to FIG. 4, if the parking sensor apparatus (70) is attached to a higher position of the rear of the vehicle (20), the transmitting route of the ultrasonic detecting signal, which is marked by a dotted line (R') in FIG. 4B, is not close to the road surface anymore, but a higher brick (31) or the like on the road is not detected by the parking sensor apparatus. However, for driver, the parking sensor apparatus should necessarily detect the brick or the like and alarms the driver.

Based on the forgoing description, although adjusting the position of the parking sensor apparatus on the vehicle keeps the parking sensor apparatus from outputting error alarm, some lower necessary obstacles on the road are hard to detect. Therefore, adjusting the position of the parking sensor apparatus is not a good solution to decrease the erroneous determinations of the parking sensor apparatus.

In addition, the parking sensor apparatus outputs the ultrasonic signal to obtain a large detecting range, but can not avoid environment signal interference, such as the sound noise caused by air brake noise or sway of a vehicle key. To decrease times of the erroneous judgement of the parking sensor apparatus, the rear parking sensor apparatus continuously executes three determining cycles to determine whether an obstacle is existed behind the vehicle. That is, if the three determining results are positive and then the rear parking sensor apparatus will alarm driver in vehicle. However, this solution is not good enough, since a detecting cycle is executed for three times, which this situation will be delayed to output an alarm signal.

Consequently, the environment signal interference also causes the erroneous determinations of the parking sensor apparatus and can not be solved only by adjusting the position of parking sensor apparatus or by re-executing the detecting cycle to ensure that the obstacle is really existed.

SUMMARY OF THE INVENTION

The objectives of the present invention include providing a fast detecting obstacle method and parking sensor apparatus using the same to have rest response for alarming the driver.

The parking sensor apparatus has at least two ultrasonic sensors, and the method to decrease erroneous determinations of the parking sensor apparatus has a first detecting process and a second alternate process. In first detecting process, the two ultrasonic sensors are controlled to transmit and receive ultrasonic detecting signals. If a reflected ultrasonic signal is detected and an obstacle is determined to be existed according to the ultrasonic signal, the two ultrasonic sensors are controlled alternately in second alternate detecting process to further determine whether the obstacle is real or not. That is, the method and the parking sensor apparatus only requires two detecting cycles to determine the real obstacle, so the method and parking sensor apparatus have fast response whether any obstacle is close to the vehicle.

Other objectives, advantages and novel features of the invention will become more apparent from the following detailed description when taken in conjunction with the accompanying drawings.

DETAILED DESCRIPTION OF THE PREFERRED EMBODIMENT

The present invention comprises a parking sensor apparatus and a method to fast detect obstacle close to vehicle. The method is applied to the parking sensor apparatus and has a first detecting process and a second alternate detecting process. The parking sensor has at least two ultrasonic sensors.

The first detecting process has (a1) simultaneously transmitting at least two ultrasonic detecting signals by the at least two ultrasonic sensors, (b1) recording a transmitting time of transmitting the ultrasonic detecting signals, (c1) determining whether a reflected ultrasonic detecting signal is received, wherein if a determining result is positive, a transmitting duration of the reflected ultrasonic detecting signal is calculated according to the transmitting time, and then a distance between the ultrasonic sensor and an obstacle is further calculated according to the transmitting duration, but if the determining result is negative, return to the step (a1), and (d1) determining whether the obstacle exists according to a calculating result of the step (c1), wherein if a determining result of this step is negative, return to the step (a1), but if a determining result of this step is positive, the second alternate detecting process is executed.

The step (d4) also further comprises a presenting number step to preset a counting number, and a counting step for counting amounts of the positive determining results in the step (d1). If the amount is equal to the counting number, the alarm signal is produced, but if the amount is not equal to the counting number, the second alternate detecting process is executed.

The second alternate detecting process has (a2) alternately controlling the at least two ultrasonic sensors to transmit the ultrasonic detecting signal and receive a reflected ultrasonic detecting signal, wherein at the same time, one of the at least two ultrasonic sensor is controlled to transmit ultrasonic detecting signal and records a transmitting time, and then another of the at least two ultrasonic sensor is controlled to receive the reflected ultrasonic detecting signal; wherein when each ultrasonic sensor receives one reflected ultrasonic detecting signal at one time, at least two transmitting duration of the reflected ultrasonic detecting signals and at least two distances between the ultrasonic sensors and the obstacle will be calculated, (b2) determining whether the two distances are close, wherein if determining result is positive, one obstacle exists and then drives the alarm device to alarm, but if the determining result is negative, the alarm device is not driven, and (c3) returning to the first detecting process.

Figure 1:
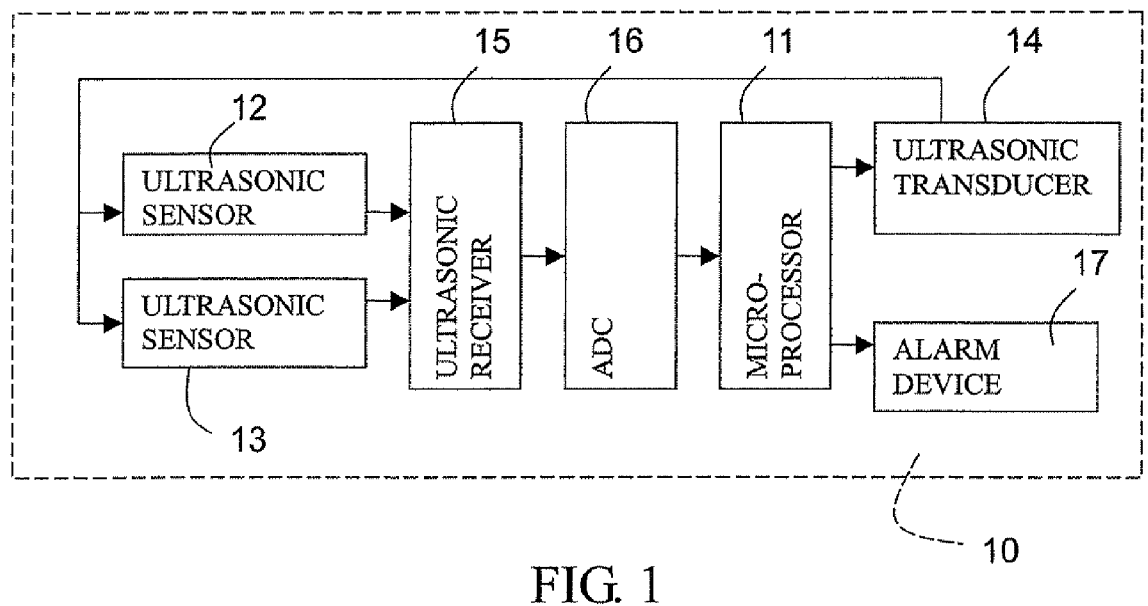
FIG. 1 is a functional block diagram of a parking sensor apparatus in accordance with the present invention.
Figure 2:
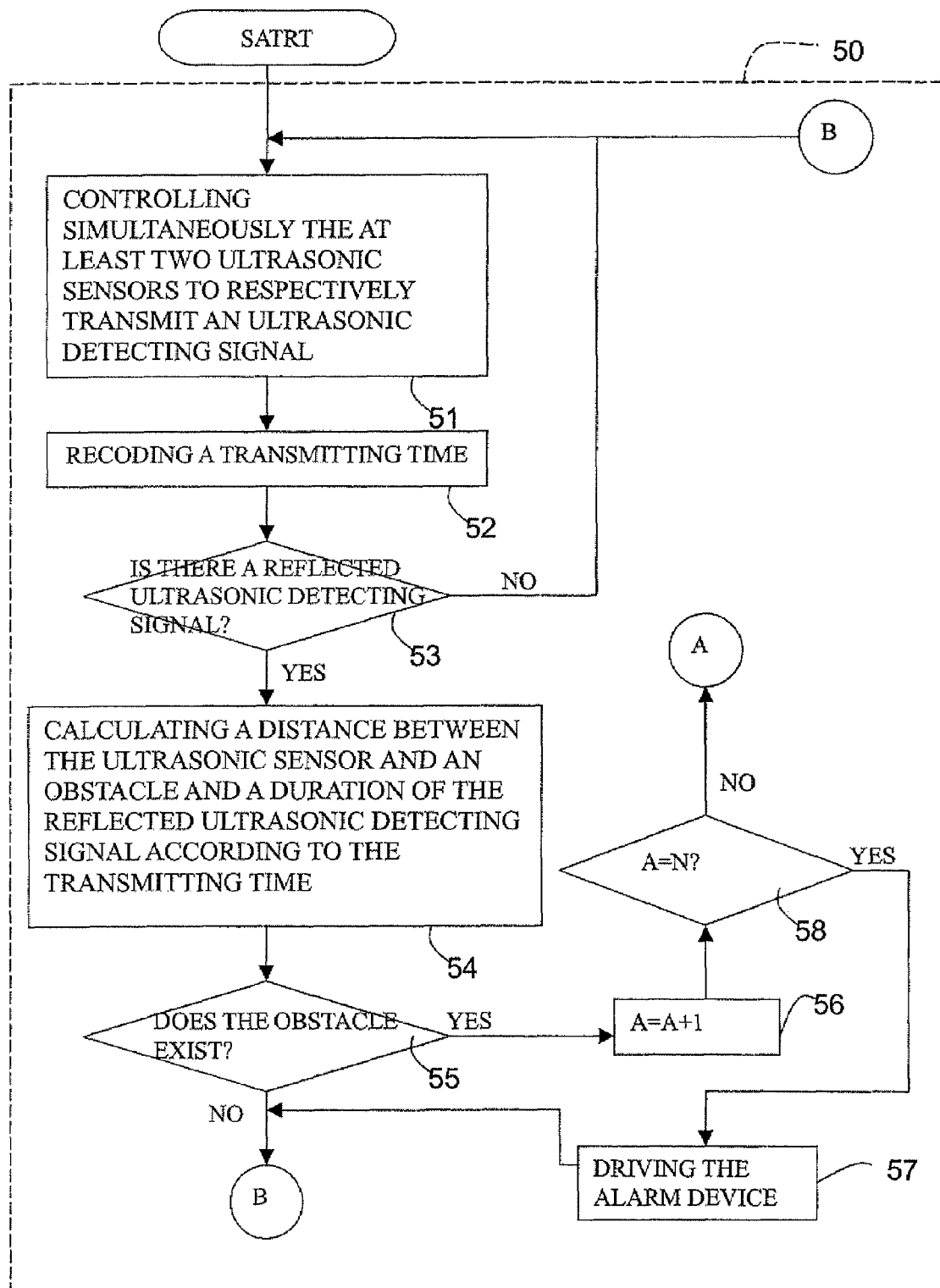
FIG. 2A is a flow chart of a first detecting process of a method in accordance with the present invention.
FIG. 2B is a flow chart of a second alternate detecting process in accordance with the present invention.
Figure 2B:
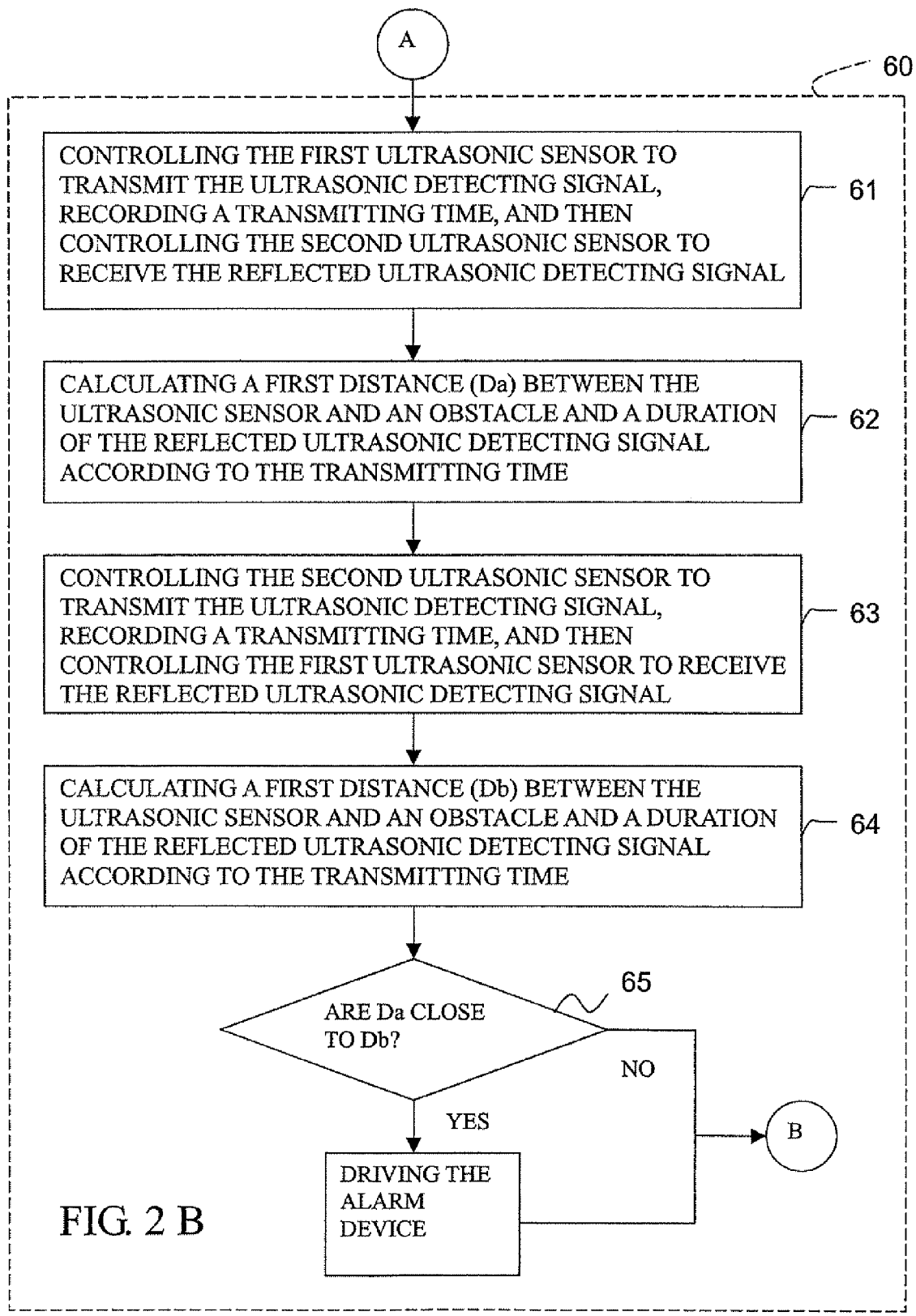

With reference to FIGS. 1 and 2, the parking sensor apparatus (10) in accordance with the present invention comprises a microprocessor (11), at least two ultrasonic sensor (12, 13), an ultrasonic transducer (14), an ultrasonic receiver (15), an analog to digital converter (ADC) (16) and an alarm device (17).

The microprocessor (21) builds a procedure of avoiding erroneous determinations and the procedure has a first detecting process (50) and a second alternate detecting process (60).

The two ultrasonic sensors (12, 13) are respectively connected to output terminals of the microprocessor (11) through the ultrasonic transducer (14) and connected to input terminals of the microprocessor (11) sequentially through the ultrasonic receiver (15) and the ADC (16).

The alarm device (17) is connected to the outputs of the microprocessor (1). The microprocessor controls operations of the alarm device (17).

The first detecting process (50) of the microprocessor (11) has following steps of:

(a1) controlling simultaneously the at least two ultrasonic sensors (12,13) to respectively transmit an ultrasonic detecting signal through the ultrasonic transducer (14) (51);

(b1) recording a transmitting time of transmitting the ultrasonic detecting signal (52) from the two ultrasonic sensors (12, 13);

(c1) determining whether a reflected ultrasonic detecting signal is received (53), wherein if a determining result is positive, a transmitting duration of the reflected ultrasonic detecting signal is calculated according to the transmitting time, and then a distance between the ultrasonic sensor (12, 13) and an obstacle is further calculated according to the transmitting duration, but if the determining result is negative, return to the step (a1); and (d1) determining whether the obstacle exists according to a calculating result of the step (c1) (54, 55), wherein if a determining result of this step is positive, the second alternate detecting process is executed, but if a determining result of this step is negative, return to the step (a1).

Once the processor determines that an obstacle close to the vehicle according to the first detecting process, the second alternate detecting process will be executed to further determine whether the final determining result of the first detecting process is correct. The second alternate detecting process (60) of the microprocessor has following steps of:

(a2) alternately controlling the at least two ultrasonic sensors (12, 13) to transmit the ultrasonic detecting signal and receive a reflected ultrasonic detecting signal, wherein at the same time, one of the at least two ultrasonic sensor (12, 13) is controlled to transmit the ultrasonic detecting signal and records a transmitting time, and then another of the at least two ultrasonic sensor is controlled to receive the reflected ultrasonic detecting signal (61, 63). When each ultrasonic sensor (12, 13) receives one reflected ultrasonic detecting signal at one time, at least two transmitting duration of the reflected ultrasonic detecting signals and at least two distances (Da, Db) between the ultrasonic sensors and the obstacle will be calculated (62, 64);

(b2) determining whether the two distances (Da, Db) are close (65), wherein if determining result is positive (66), one obstacle exists and then drives the alarm device (17) to alarm, but if the determining result is negative, the alarm device is not driven; and (c2) returning to the first detecting process (50).

Figure 3A:
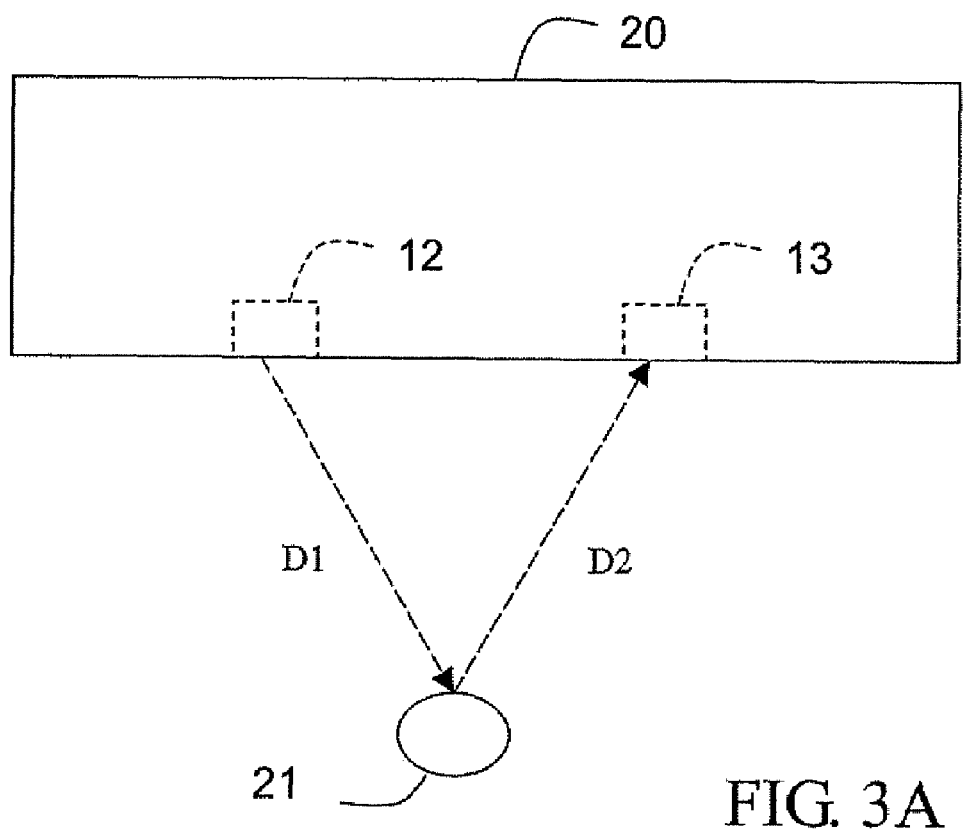
FIG. 3A is a schematic view of a transmitting route of an ultrasonic signal transmitted from parking sensor apparatus in accordance with the present invention.
Figure 3B:
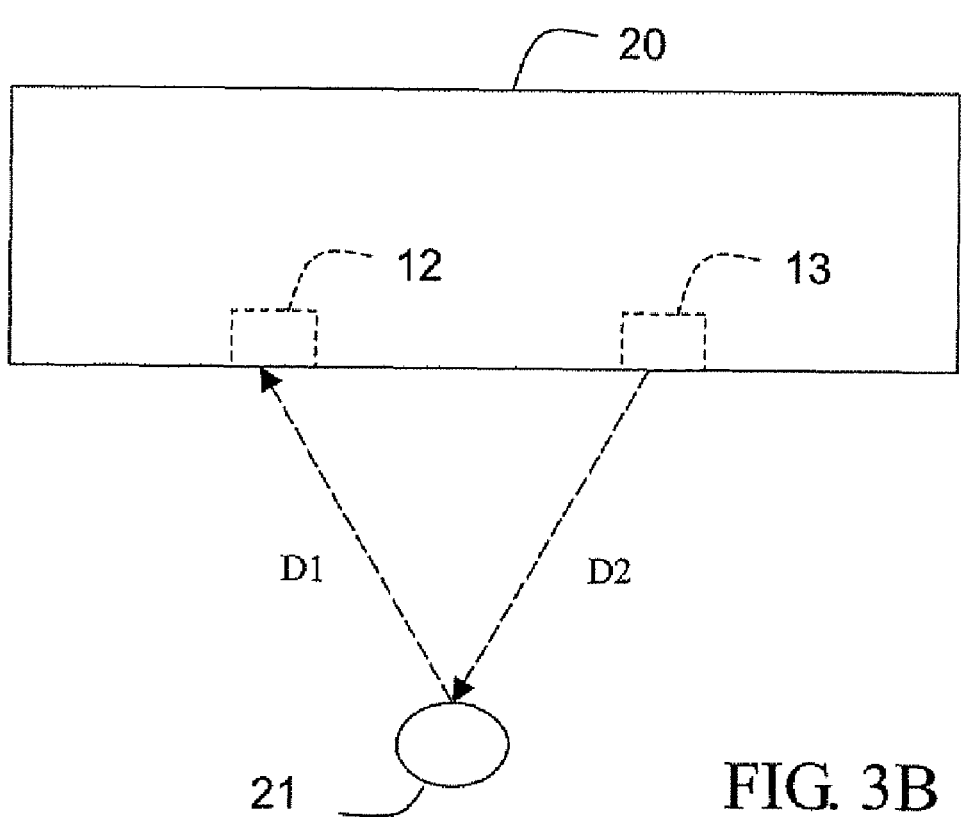
FIG. 3B is another schematic view of a transmitting route of an ultrasonic signal transmitted from parking sensor apparatus in accordance with the present invention.
Figure 4A:
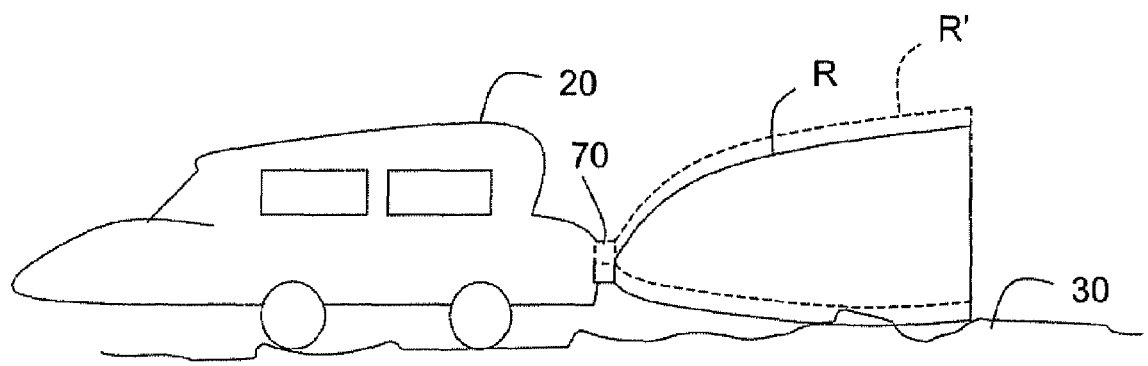
FIG. 4A is a schematic view of a shape of transmitting route of an ultrasonic signal transmitted from a parking sensor apparatus attached at a lower position of a rear of a vehicle.
Figure 4B:
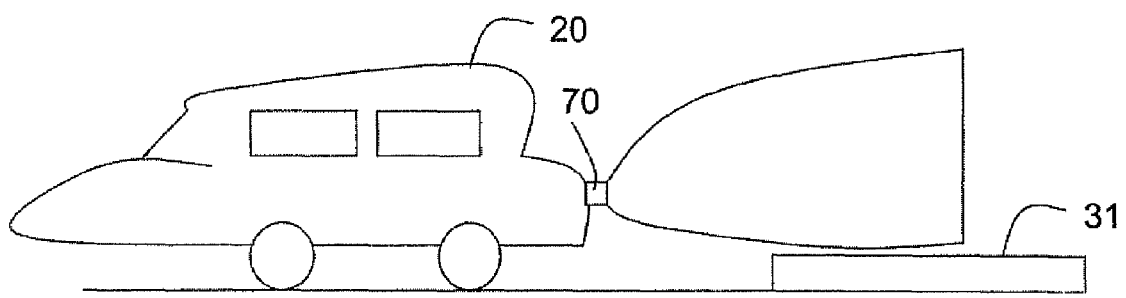
FIG. 4B is another schematic view of a shape of transmitting route of an ultrasonic signal transmitted from the parking sensor apparatus attached at a higher position of a rear of a vehicle.

With reference to FIGS. 1 and 3A, the microprocessor (11) firstly controls the first ultrasonic sensor (12) to transmit the ultrasonic detecting signal through the ultrasonic transducer (14), and then waits to receive the signal from the second ultrasonic sensor (13) through the ultrasonic receiver and the ADC (16). If the microprocessor (11) determines that the signal from the second ultrasonic sensor (13) is the reflected ultrasonic detecting signal, the microprocessor (11) will calculate a transmitting duration of the reflected ultrasonic detecting signal according to the transmitting time. Therefore, a distance (Da=D1+D2) between the ultrasonic sensors (12, 13) and the obstacle (21) is calculated according to the transmitting duration. With further reference to FIG. 3B, the microprocessor (11) controls the second ultrasonic sensor (13) to transmit the ultrasonic detecting signal, and then waits to receive a signal from the first ultrasonic sensor (12). If the first ultrasonic sensor (12) really inputs the signal to the microprocessor (11), the signal will be a reflected ultrasonic detecting signal. The microprocessor (11) calculates another transmitting duration of the reflected ultrasonic detecting signal according to the transmitting time. Therefore, a distance (Db=D2+D1) between the ultrasonic sensor (12, 13) and the obstacle (21) is calculated according to the transmitting duration.

Based on the forgoing detailed description of the first detecting process and the second alternate detecting process, the determining period is short since if one reflected ultra sonic signal is received and the determining results of the first detecting and the second alternate detecting process are positive, the alarm device will be driven to alarm the driver in vehicle. Comparing the method in accordance with the present invention with a conventional method of executing three detecting cycles to detect the obstacle, the method in accordance with the present invention only executes two detecting cycles to determine whether the obstacle exist. Since the reflected ultrasonic detecting signal could be caused by high frequency environment signal, the microprocessor (11) is hard to determine whether the reflected ultrasonic detecting signal from the ultrasonic sensor (12, 13) is really reflected by the obstacle. Therefore, the method in accordance with the present invention effectively prevents frequency environment signal from interfering the parking sensor apparatus's determination.

In some conditions, the real obstacle is existed, but the determining result of the second alternate is negative. Regarding to these conditions, the microprocessor (11) has a number counter (not shown) and the step (d1) adds a presetting counting number step and a counting step (56, 58). The number counter is preset to have a counting number (N). The counting step is used to count amounts of the positive determining results in the step (d1). If the amount is equal to the counting number, the alarm signal is produced (57) by the alarm device (17), but if the amount is not less than the counting number, the second alternate detecting process is executed.

Although the microprocessor (11) receives the two reflected ultrasonic detecting signals, the one of them or both of them could be caused by high frequency environment signal. Therefore, to decrease the erroneous determinations, the microprocessor (11) further compares whether two reflected ultrasonic detecting signals are close. If they are close, one obstacle (21) should be existed and then an alarm signal is output. On the contrary, if they are not close, the microprocessor (11) does not drive the alarm device (17) to alarm the driver. Therefore, the erroneous determinations of the microprocessor (11) are substantially decreased, too. For example, the microprocessor (11) could preset a tolerable range (±10 cm). The microprocessor (11) subtracts Db from Da to have a value and then determines whether the value falls into the tolerable range. If the value falls into the tolerable range, the microprocessor (11) determines that the reflected ultrasonic detecting signals are reflected by one existed obstacle (21) and then drives the alarm device (17). On the contrary, if the value does not fall into the tolerable range, the microprocessor (11) does not drive the alarm device (17).

Based on the forgoing description, the method in accordance with the present invention has two detecting processes to fast response and keep the erroneous determinations from determining to alarm the driver as far as possible.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the fill extent indicated by the broad general meaning of the terms in which the appended claims are expressed.

What is claimed is:

1. A parking sensor apparatus, comprising
   a microprocessor builds a procedure of avoiding erroneous determinations and the procedure has a first detecting process and a second alternate detecting process;
   at least two ultrasonic sensors respectively connected to output tem~inats of the microprocessor through an ultrasonic transducer and connected to input terminals of the microprocessor sequentially through an ultrasonic receiver and an analog to digital converter; and
   an alarm device connected to outputs of the microprocessor and driven by the microprocessor;
   wherein the first detecting process comprises steps of:
   (a1) controlling simultaneously the at least two ultrasonic sensors to respectively transmit an ultrasonic detecting signal through the ultrasonic transducer;
   (b1) recording a transmitting time of transmitting the ultrasonic detecting signal from the two ultrasonic sensors;
   (c1) determining whether a reflected ultrasonic detecting signal is received, wherein if a determining result is positive, a transmitting duration of the reflected ultrasonic detecting signal is calculated according to the transmitting time, and then a distance between the ultrasonic sensor and an obstacle is further calculated according to the transmitting duration, but if the determining result is negative, return to the step (a1); and
   (d1) determining whether the obstacle exists according to a calculating result of the step (c1), wherein if a determining result of this step is positive, the second alternate detecting process is executed, but if a determining result of this step is negative, return to the step (a1).

2. The parking sensor apparatus as claimed in claim 1, wherein the microprocessor has a number counter.

3. The parking sensor apparatus as claimed in claim 2, wherein the step (d1) further comprises:
   a presenting number step to preset the number counter to have a counting number; and
   a counting step for counting amounts of the positive determining results in the step (d1), wherein if the amounts is equal to the counting number, an alarm signal is produced, but if the amount is not equal to the counting number, the second alternate detecting process is executed.

4. The parking sensor apparatus as claimed in claim 1, wherein the second alternate detecting process comprises steps of:
   (a2) alternately controlling the at least two ultrasonic sensors to transmit the ultrasonic detecting signal and receive a reflected ultrasonic detecting signal, wherein at the same time, one of the at least two ultrasonic sensor is controlled to transmit ultrasonic detecting signal and records a transmitting time, and then another of the at least two ultrasonic sensor is controlled to receive the reflected ultrasonic detecting signal; wherein when each ultrasonic sensor receives one reflected ultrasonic detecting signal at one time, at least two transmitting duration of the reflected ultrasonic detecting signals and at least two distances between the ultrasonic sensors and the obstacle will be calculated;
   (b2) determining whether the two distances are close, wherein if determining result is positive, one obstacle exists and then drives the alarm device to alarm, but if the determining result is negative, the alarm device is not driven; and
   (c2) returning to the first detecting process.

5. The parking sensor apparatus as claimed in claim 2, wherein the second alternate detecting process comprises steps of:
   (a2) alternately controlling the at least two ultrasonic sensors to transmit the ultrasonic detecting signal and receive a reflected ultrasonic detecting signal, wherein at the same time, one of the at least two ultrasonic sensor is controlled to transmit ultrasonic detecting signal and records a transmitting time, and then another of the at least two ultrasonic sensor is controlled to receive the reflected ultrasonic detecting signal; wherein when each ultrasonic sensor receives one reflected ultrasonic detecting signal at one time, at least two transmitting duration of the reflected ultrasonic detecting signals and at least two distances between the ultrasonic sensors and the obstacle will be calculated;
   (b2) determining whether the two distances are close, wherein if determining result is positive, one obstacle exists and then drives the alarm device to alarm, but if the determining result is negative, the alarm device is not driven; and
   (c2) returning to the first detecting process.

6. The parking sensor apparatus as claimed in claim 2, wherein the second alternate detecting process comprises steps of:
   (a2) alternately controlling the at least two ultrasonic sensors to transmit the ultrasonic detecting signal and receive a reflected ultrasonic detecting signal, wherein at the same time, one of the at least two ultrasonic sensor is controlled to transmit ultrasonic detecting signal and records a transmitting time, and then another of the at least two ultrasonic sensor is controlled to receive the reflected ultrasonic detecting signal; wherein when each ultrasonic sensor receives one reflected ultrasonic detecting signal at one time, at least two transmitting duration of the reflected ultrasonic detecting signals and at least two distances between the ultrasonic sensors and the obstacle will be calculated;
   (b2) determining whether the two distances are close, wherein if determining result is positive, one obstacle exists and then drives the alarm device to alarm, but if the determining result is negative, the alarm device is not driven; and
   (c3) returning to the first detecting process.

7. A method to decrease erroneous determinations of the parking sensor apparatus, which has at least two ultrasonic sensors, comprising:
   a first detecting process comprising steps of:
   (a1) simultaneously transmitting at least two ultrasonic detecting signals by the at least two ultrasonic sensors;
   (b1) recording a transmitting time of transmitting the ultrasonic detecting signals;
   (c1) determining whether a reflected ultrasonic detecting signal is received, wherein if a determining result is positive, a transmitting duration of the reflected ultrasonic detecting signal is calculated according to the transmitting time, and then a distance between the ultrasonic sensor and an obstacle is further calculated according to the transmitting duration, but if the determining result is negative, return to the step (a1); and
   (d1) determining whether the obstacle exists according to a calculating result of the step (c1), wherein if a determining result of this step is positive, the second alternate detecting process is executed, but if a determining result of this step is negative, return to the step (a1);
   a second alternate detecting process comprising steps of:
   (a2) alternately controlling the at least two ultrasonic sensors to transmit the ultrasonic detecting signal and receive a reflected ultrasonic detecting signal, wherein at the same time, one of the at least two ultrasonic sensor is controlled to transmit ultrasonic detecting signal and records a transmitting time, and then another of the at least two ultrasonic sensor is controlled to receive the reflected ultrasonic detecting signal; wherein when each ultrasonic sensor receives one reflected ultrasonic detecting signal at one time, at least two transmitting duration of the reflected ultrasonic detecting signals and at least two distances between the ultrasonic sensors and the obstacle will be calculated;
   (b2) determining whether the two distances are close, wherein if determining result is positive, one obstacle exists and then drives the alarm device to alarm, but if the determining result is negative, the alarm device is not driven; and
   (c3) returning to the first detecting process.

8. The method as claimed in claim 7, wherein the step (d1) further comprises:
   a presenting number step to preset a counting number; and
   a counting step for counting amounts of the positive determining results in the step (d1), wherein if the amounts is equal to the counting number, the alarm signal is produced, but if the amount is not equal to the counting number, return to step (a1).

* * * * *